Sept. 3, 1968    C. E. HAMMOND ETAL    3,399,415
CONTROL SYSTEMS FOR POWER RODDER CONSTRUCTIONS
Filed May 12, 1966    4 Sheets-Sheet 1
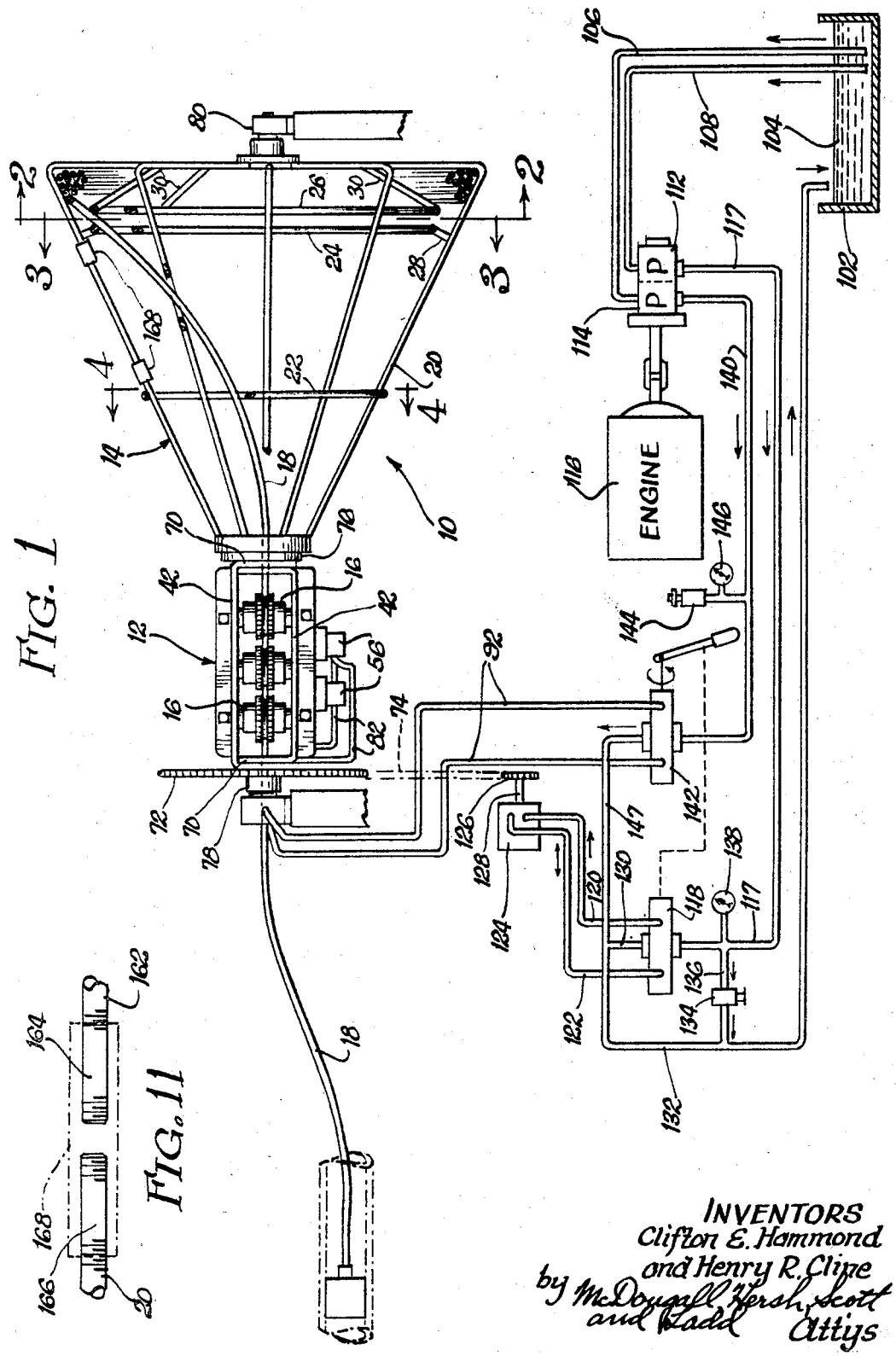
INVENTORS
Clifton E. Hammond
and Henry R. Cline
by McDougall Hersh Scott
and Ladd
Attys

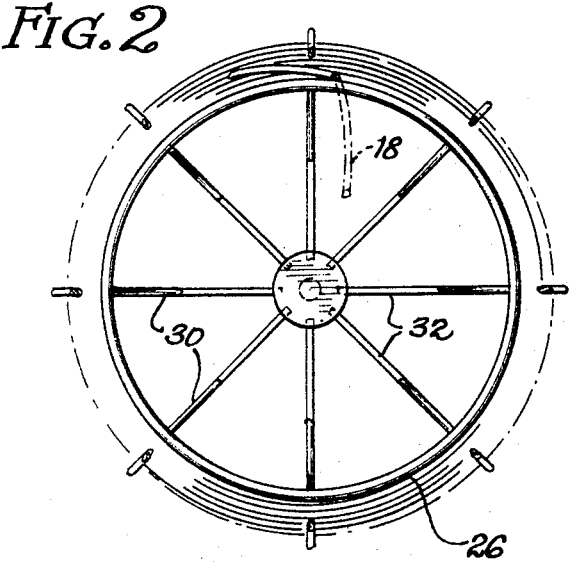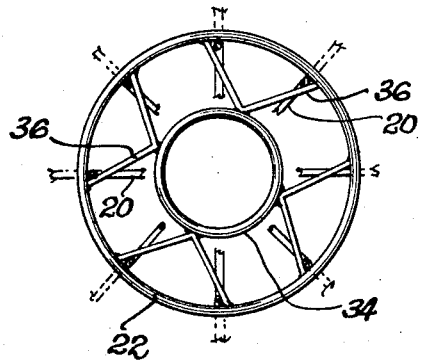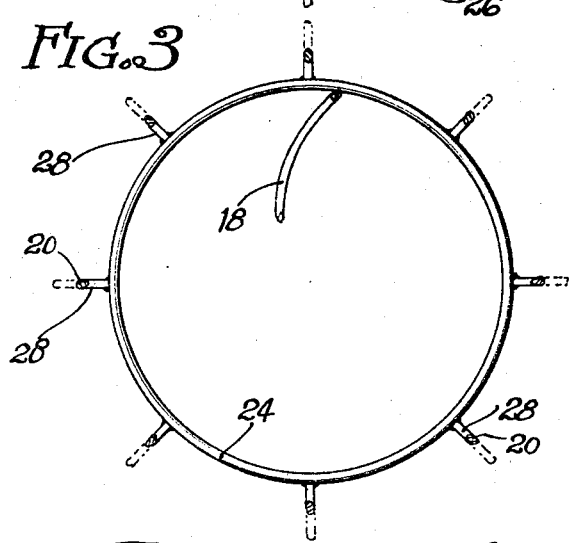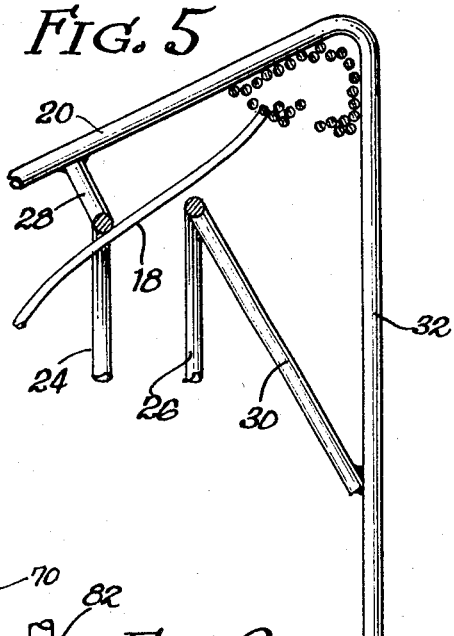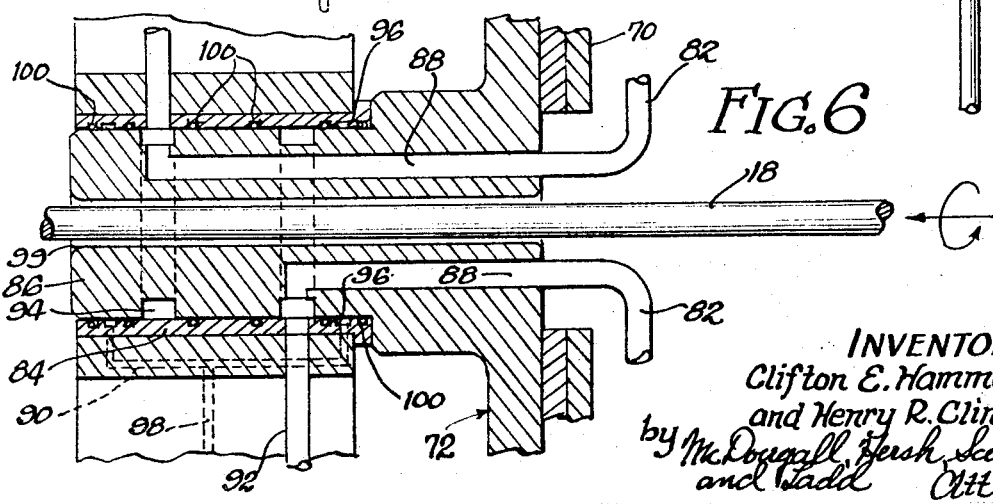

Sept. 3, 1968  C. E. HAMMOND ETAL  3,399,415
CONTROL SYSTEMS FOR POWER RODDER CONSTRUCTIONS
Filed May 12, 1966  4 Sheets-Sheet 3

INVENTORS
Clifton E. Hammond
and Henry R. Cline
by McDougall, Hersh & Scott
attys Sept. 3, 1968     C. E. HAMMOND ETAL     3,399,415
CONTROL SYSTEMS FOR POWER RODDER CONSTRUCTIONS
Filed May 12, 1966     4 Sheets-Sheet 4

INVENTORS
Clifton E. Hammond
and Henry R. Cline
by McDougall, Hersh & Scott
Attys United States Patent Office 3,399,415
Patented Sept. 3, 1968

3,399,415
CONTROL SYSTEMS FOR POWER
RODDER CONSTRUCTIONS
Clifton E. Hammond, Highland, and Henry R. Cline, Griffith, Ind., assignors to Champion Corporation, Hammond, Ind., a corporation of Indiana
Continuation-in-part of application Ser. No. 427,287, Jan. 22, 1965. This application May 12, 1966, Ser. No. 554,273
13 Claims. (Cl. 15—104.3)

This invention relates to a power rodder of the type normally used for the cleaning of sewers. The invention is particularly concerned with a power rodder construction of the type associated with a trailer whereby a continuous length of rod and drive means therefor can be associated in a compact and mobile unit.

This application is a continuation-in-part of applicants' application Ser. No. 427,287, filed on Jan. 22, 1965, and now abandoned, and entitled "Power Rodder Construction."

Rods are commonly utilized in the cleaning of sewers by pushing them into a pipe line and by concurrently rotating the rods. In many instances, extremely long lengths of rod are employed, and trailer constructions have been made available which include means for reeling of the rod lengths. The trailers incorporate mechanisms capable of driving the storage reel and also capable of imparting the feeding and retracting forces to the rod whereby the rod can be moved into and out of a sewer. In many instances, rotary reel mechanisms in the form of cages are employed whereby the rotary action can be imparted to the rod in conjunction with reeling and unreeling.

The provision of trailer units adapted to carry great lengths of rod and also adapted to carry the drive means for the rod comprises an extremely efficient arrangement. The trailer units are relatively compact and highly mobile whereby they can be conveniently used in most locations.

Difficulties have, however, been encountered with current constructions due primarily to the fact that relatively complex drive mechanisms must be employed to provide the necessary action in the rod. Specifically, it has been found necessary to provide drive means which can drive the rod axially for feeding and retracting relative to a sewer line. Such drive means must be suitable for cooperative operation with additional drive means employed for rotating the reel. In some instances, the drive means for feeding and retracting are mounted for rotary movement with the reel; however, extremely complex gearing systems are necessary with an arrangement of this type. Furthermore, it has been found necessary to provide at least three bearing positions for such an arrangement, and this also materially adds to the cost of the construction.

In other arrangements, feeding and retracting means are employed which do not rotate with the reeling construction. Such arrangements have not been found to be suitable due to their expense and since the rotating reel imparted rotary movement to the rod thereby making it difficult for the feeding and retracting means to properly engage the rod for imparting driving movement thereto.

Power rodder constructions have included the use of hydraulic motors as drive means. Such constructions include the type described in Stewart Patent No. 3,098,251 and in Ciaccio et al. Patent No. 3,176,335.

Other difficulties have been encountered with existing devices relating to the operation of the drive means and to the operation and construction of the reels. In instances where rotary and axial movement of the rod are to be independently controlled, it has been found necessary to utilize separate control levers or the like. This arrangement places burdens on the operator of the equipment to the extent that high proficiency is required for efficient operation. Improper operation due to the inability of an operator to control the device can often lead to breaking of a rod resulting in loss of an expensive rod or substantial delays. In the case of the reel construction, difficulties are encountered when a continuous rod breaks within the reel, and present reel constructions make it quite difficult to gain access to the interior of the reel to correct the problem.

It is an object of this invention to provide an improved sewer rodder construction which is characterized by a highly efficient mode of operation and by a highly practical structural combination of elements.

It is a further object of this invention to provide a sewer rodder construction which embodies unique control systems whereby the operation of the construction can be greatly simplified to thereby decrease the likelihood of equipment damage or delay due to errors in operation.

These and other objects of this invention will appear hereinafter and for purposes of illustration, but not of limitation, specific embodiments of this invention are shown in the accompanying drawings in which:

FIGURE 1 is partially a detail side elevational and partially a schematic drive circuit diagram of the sewer rodder apparatus of this invention;

FIGURE 2 is a cross-sectional view of the reel construction of the sewer rodder taken about the line 2—2 of FIGURE 1;

FIGURE 3 is a cross-sectional view of the reel construction of the sewer rodder taken about the line 3—3 of FIGURE 1;

FIGURE 4 is a cross-sectional view of the reel of the sewer rodder taken about the line 4—4 of FIGURE 1;

FIGURE 5 is a fragmentary view illustrating the manner in which the sewer rod is maintained within the reel;

FIGURE 6 is a detail cross-sectional view illustrating the bearing means employed for permitting delivery of hydraulic fluid to the rod drive motors of the construction;

FIGURE 11 is a detail view of the preferred manner of construction of the bars of the reel cage employed in the apparatus.

The power rodder of this invention is adapted to be employed in combination with a continuous length of rod which is to be wound in a rotatable reel associated with the rodder. The reel and drive mechanisms of the construction are associated in an assembly comprising a trailer or the like whereby the entire unit can be moved from place to place. The reel is of the type adapted to supply rod during feeding of the rod into a sewer, and the rod is adapted to be wound onto the reel during retracting from the sewer. It will be appreciated that the invention applies to rods comprising a continuous integral length or to rods which are formed in individual sections.

The structure of this invention is of the type having drive means which are located adjacent the entrance end of the reel. The drive means are situated on mounting means which are attached to the reel whereby the mounting means and the reel are rotatable in unison. With the arrangement described, bearing means need be located only at the opposite ends of the assembly comprising the drive means and the reel.

The instant invention preferably utilizes hydraulic motors for rotating the reel and associated mounting means, and for operating the drive means which move the rod into and out of the construction. In one specific form of the instant invention, control means are associated with the hydraulic means whereby all movements in the construction can be handled by means of a single lever. The particular control means provide for feeding out and retracting of the rod when the lever is moved back and forth in one direction while movement of the lever in a different direction provides for control of the rotatable movement of the reel.

The construction of this invention also provides improvements with respect to the feeding of fluid to hydraulic lines in the system. The lines are situated in association with one of the bearing means in the construction whereby the hydraulic fluid can be transmitted to a hydraulic motor which is rotating relative to the supply of hydraulic fluid, and the arrangement includes specific means for eliminating leakage problems.

Figure 9:
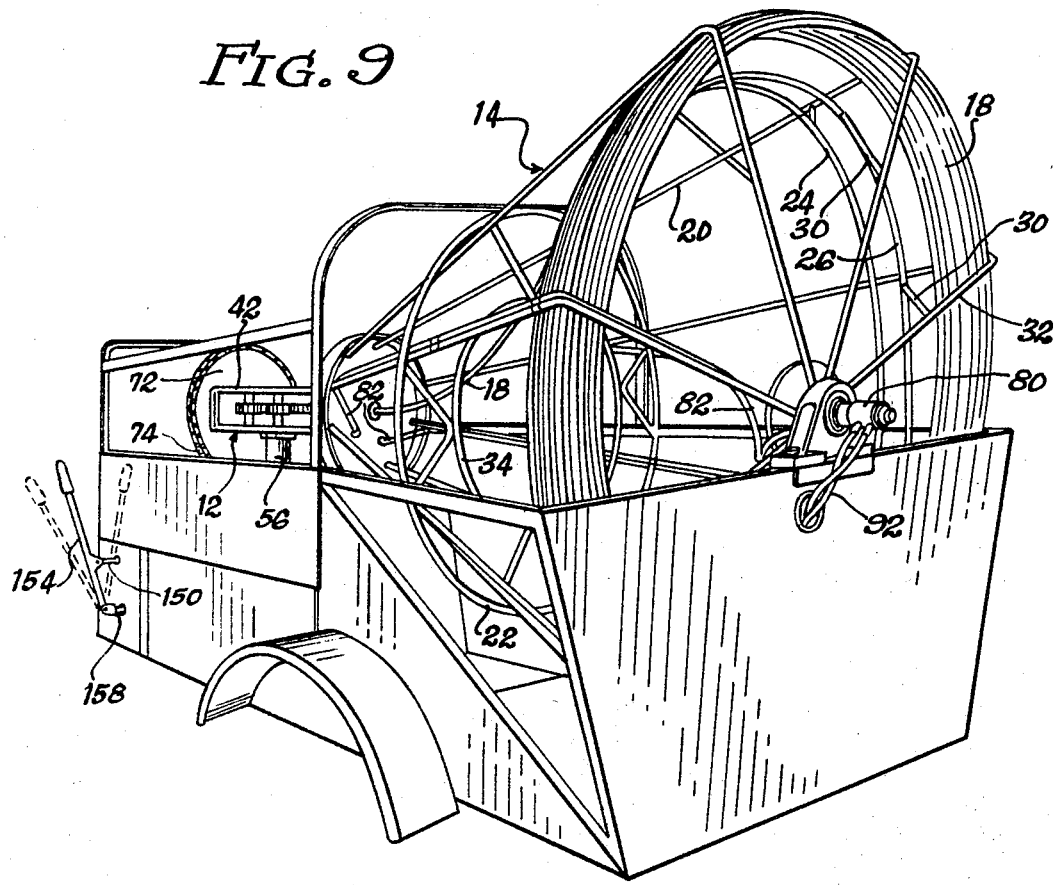
FIGURE 9 is a perspective view of the apparatus as it appears for mounting on a trailer.

FIGURES 1 and 9 of the accompanying drawings illustrate assembly 10 which includes a mounting means 12 and a reel 14. The mounting means carries rotatable roller members 16, and these members are provided for controlling the movement of rod 18 into and out of the reel 14. The reel comprises a cone-shaped cage which includes bars 20 extending from the narrow end to the wide end of the cone. A reinforcing ring 22 is provided centrally of the cage.

FIGURES 2 through 5 illustrate in detail the manner in which the reel 14 carries the rod 18. It will be noted that the reel carries a pair of inner annular rings 24 and 26. The ring 24 is connected in the construction by means of arms 28 which are connected to the bars 20 whereby the ring 24 is maintained in spaced-apart relationship with respect to the outer peripheral extent of the cage. The ring 26 is maintained in position by means of members 30 which are connected to radial arms 32 located across the wide end of the cage. An additional guide ring 34 is located within the confines of reinforcing ring 22, and spider members 36 maintain the guide ring 34 in position.

In use, the rod 18 is wound entirely within the space 40 defined at the outer periphery of the wide end of the cage. The guide rings 34, 24 and 26 serve to maintain the rod in a desired relationship with respect to the narrow end of the reel, and the relationship is such that the rod will be held against movement outside the confines of the edge.

Figure 7:
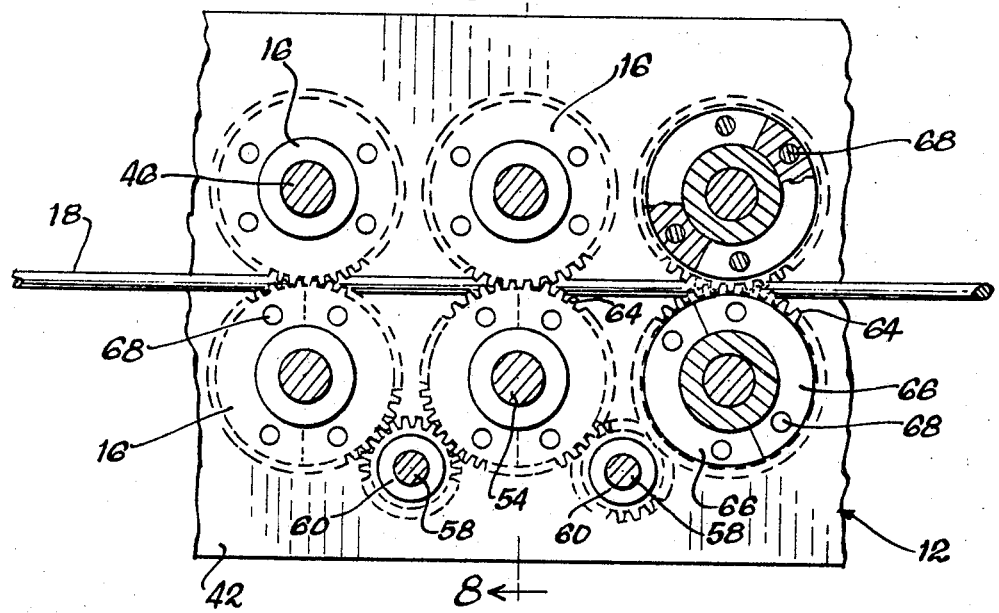
FIGURE 7 is a side view of the drive means employed for feeding and retracting of the rod.
Figure 8:
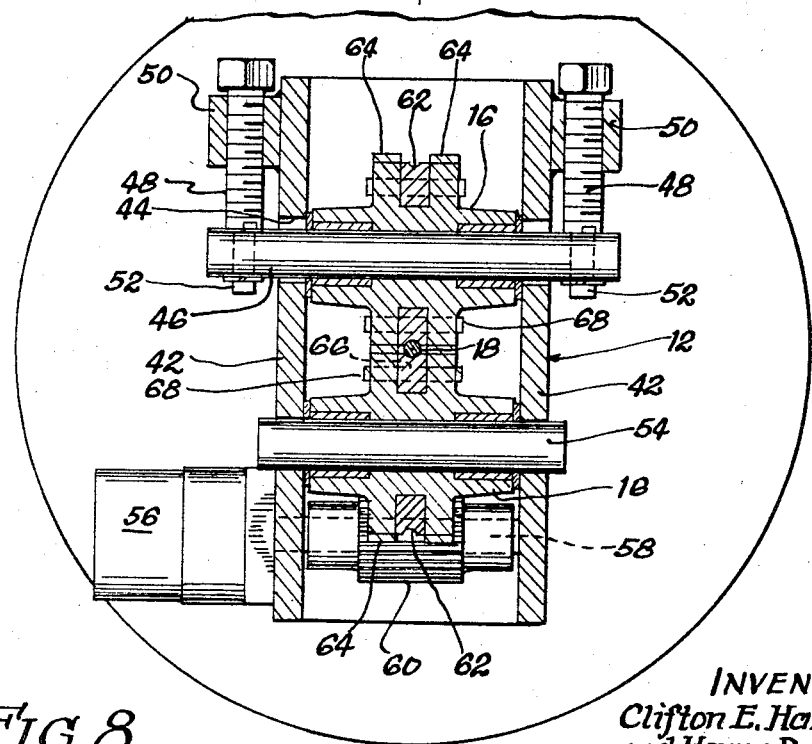
FIGURE 8 is a cross-sectional view of the drive means taken about the line 8—8 of FIGURE 7.

FIGURES 7 and 8 illustrate in detail the mounting means 12 which are employed for rotatably carrying the drive rollers 16. The mounting means include a pair of opposed plate portions 42 which define openings in their side walls. The upper openings 44 are adapted to receive the shafts 46 of the upper rollers 16. It will be noted that the shafts are freely received within these openings, and with this arrangement, the position of the upper rollers 16 with respect to the lower rollers can be adjusted. In the illustrated embodiment, the adjusting means comprise screws 48 which are received in blocks 50 welded on both sides of the plates 42. The lower ends 52 of the screws are received in openings defined by the shaft 46 whereby the position of this shaft can be adjusted by vertical movement of the screws. It will be noted that the shaft 46 is stationary and that the rollers 16 are freely rotatable around the shaft. The lower rollers 16 are mounted for rotation about shaft 54 which is also received in openings defined by the plates 42.

Hydraulic motors 56 are attached to one of the plates 42, and the drive shafts 58 of these motors carry drive pinions 60. The drive pinions mesh with the lower set of rollers 16 whereby driving movement is imparted to these rollers. It will be noted that the drive rollers 16 each define a central groove 62, and gear teeth 64 are formed in the rollers on opposite sides of the groove. The gear teeth of the upper rollers 16 mesh with the gear teeth of the lower rollers while the gear teeth of the lower rollers also mesh with the drive pinions.

In driving the rod 18, rotation of the shafts 58 in one direction will result in movement of the upper and lower rollers in unison for cooperatively imparting movement to the rod. Opposite rotation of the shafts 58 will result in movement of the rod in the opposite direction. The drive arrangement described is particularly satisfactory since the location of the gear teeth on the rollers 16 eliminates the need for separate gears and rod engaging structures. The location of gear teeth on opposite sides of the groove 62 provides ideal balance in the system, and the arrangement permits the use of the relatively simple adjusting means 48 whereby a desired grip of the rod can be achieved.

An added feature of the drive means relates to the use of inserts 66 for providing the bearing means which engages the rod 18. As best shown in FIGURE 7, the inserts 66 are semicircular members which are held in place by means of pins 68, the latter being driven through the sides of the rollers. The inserts can be readily replaced when the grooves therein have worn down to the point where desired gripping cannot be achieved.

It is contemplated that the specific drive means described could be employed in rodder constructions having different reel members and having other operating characteristics which differ from the specific construction disclosed herein. Thus, the design of the drive means of this invention, particularly the means for controlling and imparting the driving movement and the use of replaceable inserts, embodies advantages which are adaptable in other systems. A user of this drive means can replace a rapid wear segment of the roller assembly easily and economically. The major saving in this regard is due to the fact that the inserts can be replaced without any disassembly of the rollers by means of a punch and hammer. Furthermore, the inserts can be heat treated to a desired degree of hardness while maintaining a desired lesser hardness in the gear teeth.

The plates 42 of the mounting means 12 include bent-over end portions 70, and these end portions are utilized for holding the mounting means in place. The forward end of the mounting means is attached to a large drive sprocket 72 whereby a chain 74 can be utilized for imparting rotary movement to the mounting means. The other end of the mounting means is rigidly connected to the narrow end 76 of the reel 14. Accordingly, the driving section referred to provides for rotation of the mounting means and reel in unison and all of the bearing support for this assembly is provided at the forward end 78 and at the rearward end 80.

The hydraulic lines 82 provide for feeding of hydraulic fluid to the motors 56 carried by the mounting plates. These hydraulic lines extend to hydraulic coupling 79 located adjacent the bearing 80. When the reel is rotating, it is necessary to provide a means for delivering hydraulic fluid to the lines 82 without disrupting the rotary movement. The particular coupling means designed for this purpose is shown in FIGURE 6.

This arrangement includes a stationary bearing support 84 and a cylindrical member 86 which is rotatable in the support. Passage means 88 defined by the cylindrical member communicate with the lines 82. A stationary feed member in the form of a tubular element 90 is located around the cylindrical member 86. Hydraulic lines 92 feed fluid to this feeding means, and annular recesses 94 defined by the member 86 are in communication with the feeding member. The passages 88 in turn communicate with the recesses 94 whereby all fluid can be fed into the recesses and whereby return movement can be similarly accomplished. A central bore 99 provides for passage of the rod 18.

The feeding means also defines annular recesses designated 96, and these recesses are located intermediate each of the recesses 94 and the ends of the feeding means. A drain 98 connects the recesses 96 with a reservoir for the hydraulic fluid whereby any fluid passing into the recesses 94 and leaking beyond the sealing members 100 will be returned to the fluid reservoir. This arrangement effectively avoids substantial leaking problems even though hydraulic fluid is to be transferred between two relatively movable parts.

FIGURE 1 also schematically illustrates the hydraulic circuit preferably utilized in the power rodder construction of this invention. The circuit includes a reservoir 102 of hydraulic fluid 104. Lines 106 and 108 connect the reservoir with pumps 114 and 112, respectively. These pumps are driven by an engine 116 which functions to deliver the hydraulic fluid in accordance with the needs of the system. The pump 112 operates to deliver fluid from the line 108 to the line 117, and the fluid is then passed to a valve 118. Lines 120 and 122 are connected between the valve 118 and the motor 124. A drive gear 126 is mounted on the shaft 128 of this hydraulic motor, and this drive gear operates to impart driving movement through the chain 74 to sprocket 72. Accordingly, the motor 124 delivers the power for rotating the assembly comprising the mounting means 12 and the reel 14.

The valve 118 is a three-position valve whereby either of the lines 120 or 122 can be utilized to effect movement of the motor 124 in either direction. The third position of the valve 118 comprises a line 130 which permits by-passing of the valve for return of fluid through the line 132 to the reservoir 102. Obviously, in this condition, the motor 124 will not be in operation.

A safety relief valve 134 is included in line 136 which is in communication with the line 117. In the event that the motor 124 resists operation, as when the rod is jammed, a valve 134 will be caused to open as the pressure builds up beyond a desired point in the line 117 whereby an excess pressure will not be applied to the motor 124. Indicator 138 will provide a visual indication of the pressure in the line 117.

The pump 114 delivers hydraulic fluid from the line 106 to the line 140 and the fluid is thereby passed to valve 142. The valve 142 is connected to the lines 92 which pass fluid to the described connection at the bearing 80. Each of the lines 92 is connected in the manner described to a line 82 which is in turn connected to one of the motors 56. As in the case of the lines 120 and 122, the lines 92 act as both feed and return lines depending on the direction of rotation of the motors 56. A similar safety valve arrangement comprising valve 144 and indicator 146 is provided for the line 140. In addition, a line 147 permits by-passing of the lines 92 when operation of the motors 56 is not desired.

Figure 10:
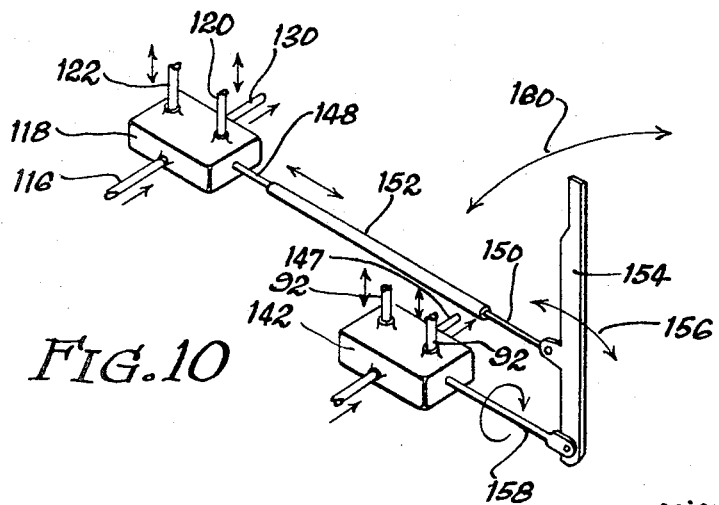
FIGURE 10 is a perspective illustration of the control lever and drive motor control valves operated thereby.

The valves 118 and 142 are conventional three-position valves; however, the instant invention contemplates a specific control means for operation of these valves whereby a single operator can efficiently control the rotation of the construction as well as the axial movement of the rod through the construction. The valve means 118 may comprise a conventional piston member having openings adapted to be aligned with the respective lines depending upon the piston within the valve. In the embodiment shown in FIGURE 10, axial movement is adapted to be imparted to the piston of the valve 118 to provide the desired control.

Changes in operation of the valve 118 are controlled by means of rods 148 and 150 and by means of a flexible connector 152 disposed between these rods. A control lever 154 is adapted to be pivoted about its bottom end as indicated at 156 whereby axial movement of the piston within the valve 118 can be achieved.

The piston within the valve 142 is also of a conventional nature; however, in this instance, rotary movement is imparted to the piston. The rotary movement is accomplished by means of a link 158 connecting the piston to the lever 154. When the lever is pivoted as indicated at 160, rotary action is imparted to the link 158 whereby selective positioning of the valve piston can be achieved.

It will be appreciated that with the desired arrangement, an operator can control both movements in the system by means of the lever 154. It will be noted that the lever 154 can be operated in any respect at any time due to the provision of the flexible connector 152. For example, if the lever were pivoted to one extreme position along the line 160 pivotal movement can still be achieved along the line 156. Similarly, an angular component of movement could be imparted to the lever 154 to vary both the driving action imparted to rotate the reel and imparted for driving the rod.

The use of a double pump provides important advantages from the standpoint of completely independent driving action. Thus, the separate pumps individually control the drive motors for axial and rotary movement, respectively. Where a single pump is employed for feeding the fluid to the respective motors, there is an influence between the drives under certain conditions. This tends to minimize the value of the single lever control since the operator cannot expect positive reaction of one of the drives when the condition of the other drive introduces a variable factor.

FIGURES 1 and 11 illustrate an arrangement for the bars 20 of the cage whereby easy access to the interior of the cage can be accomplished. Specifically, the arrangement involves the use of a removable section 162. The ends 164 of the section 162 and the respective ends 166 of the bars 20 are threaded whereby an internally threaded member 168 can be employed for connecting the section in the construction. By appropriate use of left- and right-hand threading, the members 168 can be utilized for tightening the sections 162 in the system and for permitting easy removal of these sections.

The use of removable sections for any or all of the bars 20 is contemplated, and it will be appreciated that the arrangement will permit workmen to gain access to the interior of the cage in an extremely efficient fashion. Such access is particularly desirable where a rod must be replaced due to breakage or for other reasons.

The power rodder construction described provides an extremely economical and efficient arrangement when compared to conventional constructions. The use of an interconnected mounting means and reel greatly simplifies the operation of the means employed for drivingly engaging the rod. Since the gearing mountings for the assembly are located at the opposite ends thereof, it will be obvious that the assembly can be constructed in an efficient manner. Moreover, there is no need to provide a bearing arrangement combining differential gearing between the means employed for driving the cable and the reel structure. It will be understood, however, that intermediate bearing means could be provided to add support.

With respect to the drive arrangement disclosed herein, it will be appreciated that various arrangements could be employed without departing from the spirit of the invention. For example, a completely separate drive unit could be employed for the reel, such as gasoline engine. The control lever referred to could still be interconnected to the separate drives for operation of the unit with a single lever.

With respect to the bearing arrangement permitting feeding of the hydraulic fluid, it will be obvious that the arrangement could be located at the opposite end of the assembly as described in the aforementioned application. In the case of the control lever, other valve arrangements, particularly a reversal of the described arrangement, are clearly possible and are contemplated by the instant invention. In addition, it is to be noted that various features of the instant invention do not require hydraulic operation, and it is clearly contemplated that other well-known power systems could be employed. Finally, equivalent means for imparting driving movement in the construction, including substitutes for the chain and sprocket driving and the intermeshing gears of the rod drive means, are obviously available.

It will be understood that various changes and modifications may be made in the constructions described which provide the characteristics of this invention without departing from the spirit thereof particularly as defined in the following claims.

That which is claimed is:

1. In a power rodder apparatus adapted to impart rotary driving movement to a rod through one drive means, and axial driving movement to a rod through a separate drive means, said drive means including hydraulic motors, the improvement comprising a single control lever for said drive means, a valve means for each of said drive means interposed between said control lever and said drive means, means connecting said lever to each of said valve means whereby movement of said connecting means is adapted to control the speed and direction of each of said drive means, said single lever being pivotally mounted for movement in separate planes and for movement to an infinite number of positions between said planes, and said connecting means comprising lengths between said valves and said lever with one of said valves being operated when said lever is moved in either of said planes and with both of said valves being operated when said lever is moved to any of said positions between said planes, a hydraulic fluid reservoir, and separate pump means for independently introducing hydraulic fluid through said valve means to the respective drive means.

2. In a power rodder wherein a continuous length of rod is adapted to be wound in a storage means and is adapted to be played out from the storage means by drive means in the construction, the improvement wherein said drive means comprises drive rollers engaging opposite sides of said rod for imparting driving movement thereto, said drive rollers each defining gear teeth with the gear teeth of the rollers on one side of the rod meshing with the gear teeth of the rollers on the other side of the rod, an annular recess defined adjacent the gear teeth of each roller, bearing members received in each recess for forming the portion of the rollers directly engaging said rod whereby the rod is passed between the bearing members of the rollers, and wherein said bearing members comprise inserts removably held by said rollers whereby the inserts are adapted to be replaced.

3. An apparatus in accordance with claim 2 including mounting means for said rollers and wherein said rollers comprise a plurality of idler rollers engaging the top of said rod and a plurality of idler rollers engaging the bottom of said rod, motor means on said mounting means, and drive pinions operated by said motor means for imparting driving action to said drive rollers.

4. An apparatus in accordance with claim 3 wherein the gear teeth on said idler rollers are defined on both sides thereof and wherein said bearing means is defined between the gear teeth in each of said rollers.

5. A power rodder in accordance with claim 2 wherein the gear teeth on said rollers are defined on both sides thereof and wherein said bearing means is defined between the gear teeth in each of said rollers.

6. A power rodder in accordance with claim 2 wherein mounting plates are located on either side of said rollers and gear teeth with the shafts of said rollers and gear teeth being journaled in said mounting plates, and including a drive motor mounted on the outside of at least one of said mounting plates, the drive shaft of said drive motor extending through said one mounting plate for driving connection with said gear teeth.

7. In a power rodder wherein a continuous length of rod is adapted to be wound in a rotatable reel, and wherein the rod is adapted to be played out from said reel to drive means in the construction, the improvement wherein said reel and said drive means comprise an assembly with said drive means being located adjacent the entrance end of said reel, mounting means for said drive means attached at one end to said entrance end of said reel and rotatable therewith, motor means for operating said drive means attached to said mounting means and rotatable therewith, bearing means located at the other end of said mounting means and at the other end of said reel providing the sole support for said assembly, lines for supplying energy for driving said motor, said lines extending from said motor to the bearing means at said other end of said mounting means and wherein said motor comprises a hydraulic motor, the bearing means at said other end of said mounting means including a stationary bearing support and a cylindrical member attached to said mounting means and rotatable in said support, passage means in said cylindrical member and means for attaching said lines to said passage means, a stationary feed member, and second lines connecting said feed member to the passage means in said cylindrical member for delivering hydraulic fluid to said first mentioned lines, said cylindrical member defining a pair of annular recesses for receiving fluid from said second lines, said passages communicating with said annular recesses, additional annular recesses defined by said member on opposite sides of the annular recesses in said cylindrical member, and a drain passage communicating with the recesses in said feed member for draining off fluid leaking past the annular recesses in said cylindrical member.

8. In a power rodder wherein a continuous length of rod is adapted to be wound in a rotatable reel wherein first drive means are provided for rotating the reel, and wherein the rod is adapted to be played out from said reel by second drive means in the construction, the improvement wherein said reel and said drive means comprise an assembly with said drive means being located adjacent the entrance end of said reel, mounting means for said drive means attached at one end to said entrance end of said reel and rotatable therewith, bearing means located at the other end of said mounting means and at the other end of said reel, and control means for said drive means, said control means comprising the combination of a single lever and connecting means for connecting said lever to each of said drive means whereby movement thereof controls the speed and direction of the drive means, said first and second drive means comprising hydraulic motors, and said control means including a source of hydraulic fluid, hydraulic lines connecting said source with each of said hydraulic motors, and valves interposed in said lines for controlling the passage of fluid to said motors, said connecting means interconnecting said lever with said valves whereby pivotal movement of said lever controls the operation of said hydraulic motors.

9. A power rodder in accordance with claim 8 wherein said rodder includes a housing covering said drive means and wherein said lever is mounted at the side of said housing, one of said valve means comprising a rotatable control member, a rod member extending from said lever perpendicular to said housing and connected to said rotatable member, said lever being mounted for pivotal movement about the axis of said rod member to thereby operate said one valve means, and wherein the other of said valve means comprises a reciprocally movable member, and a flexible link connecting said reciprocally movable member to said lever whereby pivotal movement of said lever in a direction longitudinally of said link will operate said other valve means.

10. A power rodder in accordance with claim 9 wherein said first drive means includes a drive gear attached to said assembly at said other end of said mounting means, the motor for said first drive means being mounted in a stationary position within said housing and including means for transmitting driving movement from said motor to said drive gear.

11. A power rodder in accordance with claim 9 wherein said second drive means comprise drive rollers engaging opposite sides of said rod for imparting drive movement thereto, and wherein said mounting means comprise opposed members rotatably mounting said rollers, and including motor means for operating said second drive means, said motor means being attached to said mounting means and being rotatable therewith.

12. In an apparatus adapted to impart simultaneous axial and rotary movement to an element passing therethrough, said apparatus including a first drive means for engaging said element to drive the element axially and a second drive means for imparting rotary movement to means holding the element, and including hydraulic motors for each of said drive means, the improvement comprising a single control lever for said motors, a valve means for each of said motors interposed between said control lever and said motors, means connecting said lever to each of said valve means, said connecting means including a flexible link movable axially of one of said valve means for operating the valve means as said lever is pivoted toward and away from said one valve means, and a rotary rod member connected to the other valve means, and connected to said lever, said rod means rotating in said other valve means for operating the valve means as said lever is pivoted about the axis of said rod means.

13. In an apparatus which comprises a rotating construction and which includes a hydraulic motor mounted on the construction, a source of hydraulic fluid situated apart from the construction whereby the construction rotates relative thereto, and feed lines for passing hydraulic fluid to said hydraulic motor, the improvement comprising means for transferring the fluid from lines leading from said source to lines associated with said construction and rotating relative to said first mentioned lines, said means including a stationary bearing support, a cylindrical member attached to said construction and rotatable in said support, passage means in said cylindrical member and means for attaching the lines carried by said construction to said passage means, a stationary feed member, said lines leading from said source being connected through said feed member to the passages in said cylindrical member, and wherein said cylindrical member defines a pair of annular recesses for receiving fluid from said feed member, said passages communicating with said annular recesses, additional annular recesses defined by said member on opposite sides of the annular recesses in said cylindrical member, and a drain passage communicating with the recesses in said feed member for draining off fluid leading past the annular recesses in said cylindrical member.

References Cited
UNITED STATES PATENTS

| | | | |
|---|---|---|---|
| 2,659,540 | 11/1953 | Sketchley | 15—104.3 |
| 3,071,794 | 1/1963 | Prange | 15—104.3 |
| 3,176,335 | 4/1965 | Ciaccio et al. | 15—104.3 |

EDWARD L. ROBERTS, *Primary Examiner.*